United States Patent [19]
Lian et al.

[11] Patent Number: 5,824,436
[45] Date of Patent: Oct. 20, 1998

[54] ELECTRICALLY CONDUCTIVE POLYMERIC COATING FOR AN ELECTROCHEMICAL CHARGE STORAGE DEVICE

[75] Inventors: Ke Keryn Lian, Palatine; Han Wu, Barrington; Changming Li, Vernon Hills, all of Ill.

[73] Assignee: Motorola, Inc., Schaumburg, Ill.

[21] Appl. No.: 808,269

[22] Filed: Feb. 28, 1997

[51] Int. Cl.[6] ............................ H01M 4/66; H01G 9/00
[52] U.S. Cl. .................... 429/245; 429/233; 361/502; 252/519.34
[58] Field of Search ...................... 429/245, 233; 252/519.33, 519.34, 521.5; 361/502

[56] References Cited

U.S. PATENT DOCUMENTS 5,232,775  8/1993  Chamberlain et al. .
5,271,871  12/1993  Yasutomi et al. ................. 252/521.5
5,547,782  8/1996  Dasgupta et al. .................. 429/245 X
5,578,399  11/1996  Olsen ............................... 429/245

Primary Examiner—John S. Maples
Attorney, Agent, or Firm—Felipe J. Farley

[57] ABSTRACT

An electrochemical cell is provided with first (10) and second (11) electrodes and a solid polymer electrolyte (15) disposed therebetween. The electrodes include a current collecting layer, a layer of electrode active material, and a layer of an electrically conductive, polymeric protection material disposed therebetween. The protective layer protects, for example, the current collecting layer from the deleterious effects of the acid or alkaline electrolyte active species found in most electrochemical cells. The protective layer is formed of an intermetallic compound dispersed through a layer of appropriately chosen polymeric material.

12 Claims, 1 Drawing Sheet

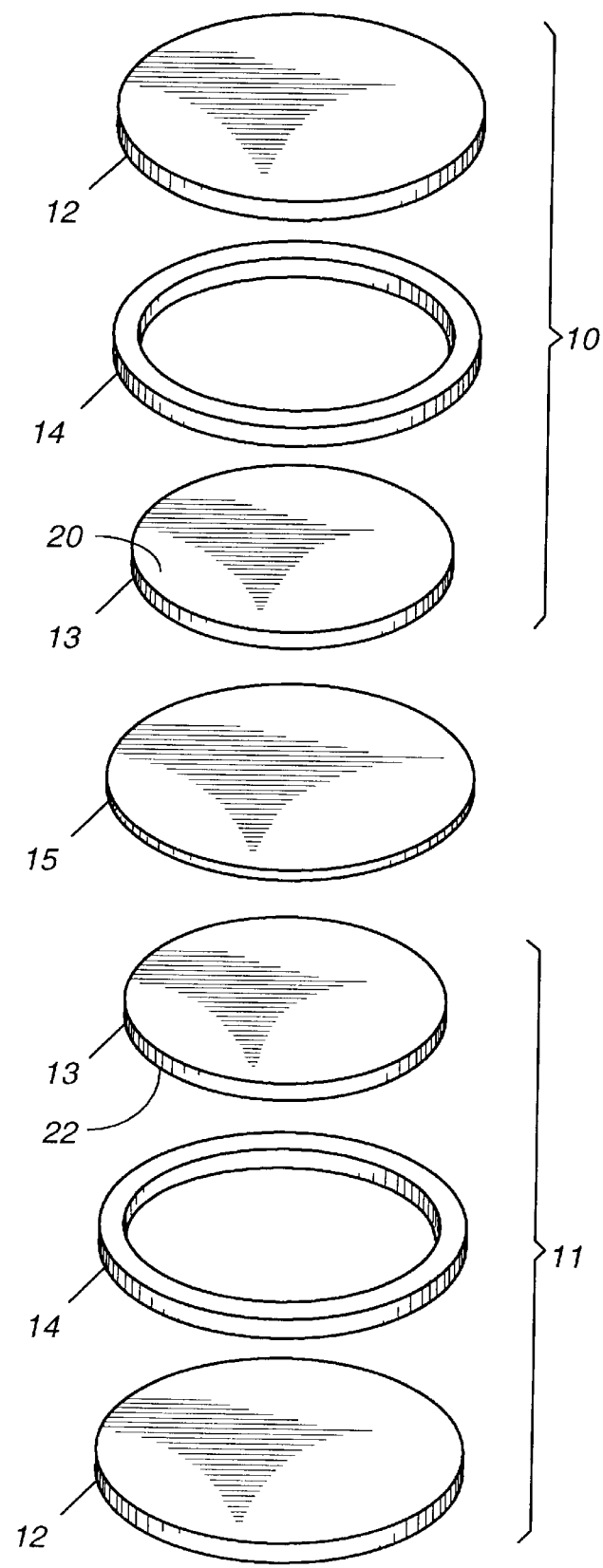

ડ,824,436

ELECTRICALLY CONDUCTIVE POLYMERIC COATING FOR AN ELECTROCHEMICAL CHARGE STORAGE DEVICE

TECHNICAL FIELD

This invention relates in general to coating materials for use with electrically conductive materials, and in particular, to electrically conductive polymeric materials used as coatings on metallic or other conductive materials. The invention most particularly relates to electrically conductive polymeric coatings for use in connection with the current collectors of electrochemical cells, and specifically acid based electrochemical cells.

BACKGROUND

It has long been known that many abundant, and hence inexpensive, metals such as nickel, aluminum, and copper are highly corroded by exposure to acidic environments. Similarly, other common metals are easily corroded by exposure to alkaline environments. The result has been that a number of such readily available materials have not heretofore been available for use in a number of devices which have corrosive environments. Examples of such devices include batteries, capacitors, electrochemical sensors, electrochromic devices, and PC boards, to name a few.

Several attempts have been made to solve these problems by replacing the corroding materials with other metals that are not corroded by the surrounding environment. Several metals are well known to not corrode in the presence of either acid or alkaline media, examples of which include platinum, titanium, niobium, gold, and tungsten to name a few. However, cost for these materials is too great to allow them to be used economically in commercial products. Other proposed solutions are described in, for example, U.S. Pat. No. 5,578,399 to Olsen, which describes a polymeric current collector for an electrochemical battery device. The polymeric current collector of the '399 patent includes a cured or curable polymer which has a conductive material such as graphite, carbon black, metal particles, or conductive polymers dispersed therein. While this approach may be useful for the application described in the '399 patent, there may be drawbacks associated with cost, processing, and compatibility with other types of systems.

Accordingly, there exists a need to provide novel electrically conductive coating layers, such as protective layers, on materials used in corrosive or potentially corrosive environments. The protective layer or coating must itself be electrically conductive to a degree sufficient to accommodate the electrical requirements of the device into which it is applied. Moreover, the protective coating material must be able to be reliably deposited in a pin-hole or defect free manner to assure that no corrosive materials come into contact with the material to be protected. In the embodiment in which the device is, for example, an acid based electrochemical cell, the protective layer must be sufficiently conductive to efficiently collect current from the device electrodes, while adequately protecting the underlying layers and materials from the corrosive effects of the acids. Finally, fabrication of such a protective, conductive layer should be relatively simple, inexpensive and readily repeatable.

BRIEF DESCRIPTION OF THE DRAWING

FIG. 1 is a simplified representation of an electrochemical charge storage device in accordance with the instant invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a simplified representation of an energy storage device such as an electrochemical charge storage device fabricated from a pair of electrode assemblies 10 and 11, which may be the anode and the cathode of the device. The electrochemical charge storage device may be an electrochemical capacitor or an electrochemical battery cell. It is to be understood however that the electrically conductive, protective layer described in detail hereinbelow is not limited to these types of applications. Other types of devices which are used with corrosive environments may apply the instant invention with equal advantage.

The electrochemical capacitor is preferably an electrochemical capacitor characterized by an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they may be each made from one or more materials selected from the group consisting of ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, and combinations thereof. Alternatively, said electrodes may be fabricated of conducting polymers.

Each electrode assembly may further include a current collector 12 which is electrically conducting. The current collector 12 is preferably fabricated of a relatively inexpensive material such as for example, aluminum, nickel, copper or others. However, as noted above, these types of materials are not chemically inert in the electrolyte 15. A housing or gasket 14 may be employed to house the electrode and the electrolyte, but is optional.

The electrolyte 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

Dispersed through the polymer film is an electrolyte active species, for example an acid or alkaline material. Specific examples of the electrolyte active species can include acidic electrolytes such as $H_3PO_4$, $H_2SO_4$, and HCl to name a few, while alkaline electrolytes can include KOH, NaOH, and LiOH. It is these materials which are particularly corrosive to the metal current collectors described above.

Accordingly, and in an effort to avoid the problems described relating to the corrosion of the current collectors, there is provided an electrically conductive, polymeric protection layers 20 and 22 operatively disposed between the current collectors and the electrodes. The protection layer or layers comprise a polymeric matrix into which is dispersed an electrically conductive filler material. The filler material, unlike the prior art, is preferably an intermetallic compound or compounds. This has the advantage of being typically fairly inexpensive, while assuring resistance to the corrosive effects of the acid or alkaline electrolyte active species.

Generally speaking, the intermetallic compound or compounds can be any electrically conductive transition metal boride, phosphide, carbide, sulfide, nitride or oxide. In addition, one or more of these intermetallic compounds can be used in combination. The inventors have further found that particular intermetallic compounds have better utility in different environments: That is certain intermetallics work better than others in various alkaline or acidic environments. For example, preferred acid resistant intermetallics include CrN, NbN, NbC, TiC, HfC, $W_2C$, $Mo_2C$, $MoB_2$, $TiB_2$, TaC, $ZrB_2$, and combinations thereof. Similarly, preferred alkaline resistant intermetallics include NiB, NiP, $Fe_2P$, $Ni_2B$, $CoP_3$, $Ni_2P$, and combinations thereof. The intermetallic filler materials comprise between 35 and 80 weight percent (wt. %) and preferably between 50 and 60 wt. %. The intermetallics are preferably in the form of powders which are dispersed through the polymer materials. The powders thus preferably have an average particle size of between about 1 and 100 microns ($\mu$m), and preferably less than about 10 $\mu$m.

As noted above, the intermetallics are dispersed through a layer of a polymeric material. Indeed, the intermetallics may be dispersed in any epoxy or polymer, examples of which include phenolic resins, biphenol A epoxy resins, glycidyl ether novolac resins, polyimides, polyester resins (e.g., vinyl esters, biphenol A formarates), polyurethanes, fluoropolymers, polyamides, and polyamide-imides, acrylates, methacrylates, and combinations thereof.

A better understanding of the invention may be gained by a perusal of the following examples.

EXAMPLE 1

To reach a desirable electrical conductivity and viscosity, 15 grams (g) of TiC (commercially available from H. C. Starck, Inc.) and 10 g of Epoxy resin (in B stage) (commercially available from V. J. Dolan, Inc.) were mixed mechanically. The mixture was doctor bladed onto an Al foil and thermally cured at 260° C. for 5 minutes followed by 300° C. for 25 minutes. The curing time may vary depending on the resin. The cured layer had a thickness of approximately 0.8 mil. A second layer can be coated, or a bipolar structure can be formed, when necessary. The cured layer together with the Al foil becomes the new substrate for depositing electrochemically active materials in liquid or powder form.

The electrical properties were measured using 4-point measurement with a Hewlett-Packard milliohmmeter across a 1×4 centimeter (cm) strip. The substrate was covered with 85% $H_3PO_4$ and heated in 130° C. Corrosion was examined by visual inspection for bubble formation and delamination of the electrodes. None was found.

EXAMPLE 2

25 g NbC (commercially available from Aldrich Chemical) and 10 g of Epoxy resin (in B stage) (V. J. Dolan Inc.) were mixed mechanically. The mixture was doctor bladed onto an Al foil and thermally cured at 260° C. for 5 min followed by 300° C. for 25 min. The cured layer had a thickness of approximately 0.8 mil. The cured layer together with the Al foil becomes the new substrate for depositing electrochemically active materials in liquid or powder form.

The electrical properties were measured using 4-point measurement with a HP milliohmmeter across a 1×4 cm strip. The substrate was covered with 85% $H_3PO_4$ and heated in 130° C. Corrosion was examined by visual inspection for bubble formation and delamination of the electrodes. None was found.

The properties of the two previous materials, along with others, were tested and are reported in Table I below.

TABLE I

| Materials (coated on Al foil) | Ink composition (filler in wt %) | Surface resistance* (m$\Omega$) | High temperature Chemical resistance** |
|---|---|---|---|
| Resin + NbN (−325 mesh) | 71.4 | 14 | corroded after 20 min |
| Resin + NbC (<5 $\mu$m) | 66.7 | 10 | no corrosion over 45 min |
| Resin + NbC (<5 $\mu$m) | 71.4 | 5 | no corrosion over 6 hours |
| Resin + TiC (−325 mesh) | 50 | 20 | no corrosion over 4 hours |
| Resin + TiC (<3 $\mu$m) | 60 | 8 | no corrosion over 20 hours |
| Resin + TiN (<5 $\mu$m) | 60 | 10 | corroded in 30 min |
| Resin + HfN (<5 $\mu$m) | 71.4 | 70 | corroded in 30 min |
| Unfilled resin | | insulator | corroded in 5 min. |
| acetylene black | 20 | 10,000–25,000 | corroded in 10 min. |
| $Fe_2P$ (3–5 $\mu$m) 1 or 2 layers | 71.4 | 8–10 | corroded within 8 min |
| Al (1 mil) | — | 2 | Corroded instantly |
| Ti (1 mil) | — | 31 | corroded within 10 min |
| Stainless steel (1 mil) | — | 65 | no corrosion after 2 hours |

*Measured using 4-point measurement with a HP milliohmmeter across 1 × 4 cm strips.
**Visual inspection for bubble formation after heating in 130° C. The electrodes were covered with 85% $H_3PO_4$.

The chemical resistance of the resin is crucial for achieving a good chemical stability. From Table I, one can see that with the same resin, the chemical resistance varies with the filler materials. Certain materials systems have shown comparable or better results than are known for some of the noble metals.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical charge storage device comprising first and second electrode assemblies, and an electrolyte disposed therebetween, each electrode assembly comprising a layer of an electrode active material, a current collecting material layer, and a layer of an electrically conductive, polymeric protection material operatively disposed therebetween, said layer of protection material comprising a layer of a polymeric material having dispersed therein an intermetallic compound.

2. An electrochemical charge storage device as in claim 1, wherein the intermetallic compound is selected from the group consisting of electrically conductive transition metal borides, phosphides, carbides, sulfides, nitrides, oxides, and combinations thereof.

3. An electrochemical charge storage device as in claim 1, wherein said intermetallic compound is selected from the group consisting of CrN, NbN, NbC, TiC, HfC, $W_2C$, $Mo_2C$, $MoB_2$, $TiB_2$, TaC, $ZrB_2$, NiB, NiP, $Fe_2P$, $Ni_2B$, $CoP_3$, $Ni_2P$, and combinations thereof.

4. An electrochemical charge storage device as in claim 1, wherein said intermetallic compounds comprise between 35 and 80 wt. % of said protective layer.

5. An electrochemical charge storage device as in claim 1, wherein said intermetallic compounds comprise between 50 and 60 wt. % of said protective layer.

6. An electrochemical charge storage device as in claim 1, wherein said polymeric material is selected from the group consisting of phenolic resins, biphenol A epoxy resins, glycidyl ether novolac resins, polyimides, polyester, polyurethanes, polyamides, and polyamide-imides, fluoropolymers, acrylates, methacrylates, and combinations thereof.

7. An electrochemical charge storage device as in claim 1, wherein said intermetallic compounds are powders.

8. An electrochemical charge storage device as in claim 7, wherein said powders have a particle size between 1 and 100 microns.

9. An electrochemical charge storage device as in claim 1, wherein said electrode active material is selected from the group consisting of Ru, Ir, Pt, Co, W, V, Fe, Ni, Mo, Ag, Zn, Pb, Mn, conductive polymers, alloys of the foregoing, oxides of the foregoing, and combinations thereof.

10. An electrochemical charge storage device as in claim 1, wherein said electrodes are symmetric.

11. An electrochemical charge storage device as in claim 1, wherein said electrodes are asymmetric.

12. An electrochemical charge storage device as in claim 1, wherein said electrodes are fabricated of Ru.

* * * * *